United States Patent [19]

Scherbatskoy

[11] Patent Number: 4,520,468
[45] Date of Patent: May 28, 1985

[54] BOREHOLE MEASUREMENT WHILE DRILLING SYSTEMS AND METHODS

[76] Inventor: Serge A. Scherbatskoy, 1100 Everman Rd., Fort Worth, Tex. 76101

[21] Appl. No.: 383,269

[22] Filed: May 28, 1982

Related U.S. Application Data

[63] Continuation of Ser. No. 68,526, Aug. 21, 1979, abandoned, which is a continuation-in-part of Ser. No. 857,677, Dec. 5, 1977, abandoned.

[51] Int. Cl.³ .............................................. G01V 1/40
[52] U.S. Cl. ....................... 367/83; 367/85; 33/307; 175/50
[58] Field of Search ........................ 367/83, 85, 911; 33/307; 175/48, 50, 55

[56] References Cited

U.S. PATENT DOCUMENTS

| | | | |
|---|---|---|---|
| Re. 29,734 | 8/1978 | Manning | 175/232 |
| 2,435,934 | 2/1948 | Varvey et al. | 367/85 |
| 2,978,634 | 4/1961 | Arps | 175/50 |
| 3,052,838 | 9/1962 | Bennett et al. | 175/50 |
| 3,364,463 | 1/1968 | Pardue | 367/911 |
| 3,719,239 | 3/1973 | Richter, Jr. et al. | 367/83 |
| 3,958,217 | 5/1976 | Spinnler | 367/83 |
| 3,983,948 | 10/1976 | Jeter | 367/83 |
| 4,078,620 | 3/1978 | Westlake et al. | 367/83 |

FOREIGN PATENT DOCUMENTS 578484  6/1959  Canada ................................ 367/85

Primary Examiner—Nelson Moskowitz
Assistant Examiner—Ian Lobo
Attorney, Agent, or Firm—Head, Johnson & Stevenson

[57] ABSTRACT

A system for providing measurements while drilling a well in which a drill string, made up of standard lengths of drill pipes, some of which may be drill collars, extends from the earth's surface in a borehole, drilling fluid being circulated in the drill string and borehole, the measurements being transmitted to the earth by a pulser which produces, in response to electrical signals from a measuring instrument, pressure pulses in the drilling fluid which are detected and decoded at the earth's surface, the pulser being mounted in a special pulser sub which is of short length and enlarged internal diameter compared to a standard drill pipe and which is threadably secured at each end in the drill string, and an elongated housing supported by the pulser sub, the housing having an outside diameter less than the internal diameter of the drill pipe and being slidably received in drill pipe adjacent the special sub, the elongated housing containing instrumentation or batteries, or both which are connected to the pulser.

7 Claims, 5 Drawing Figures

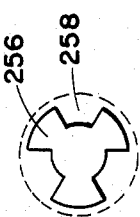
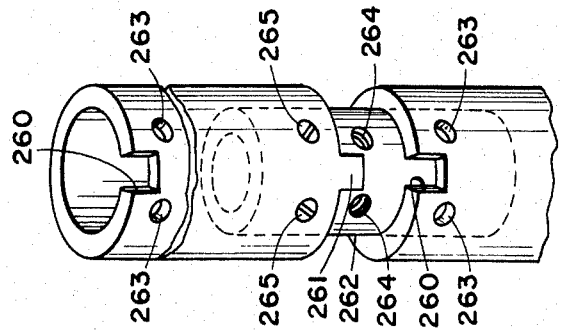
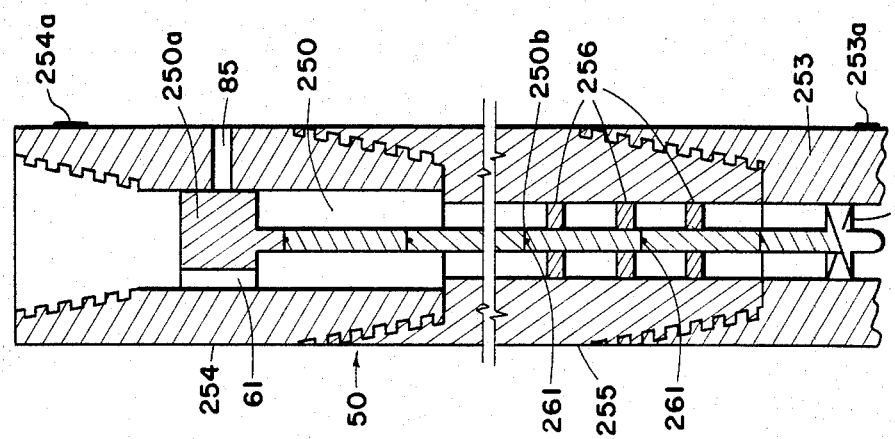
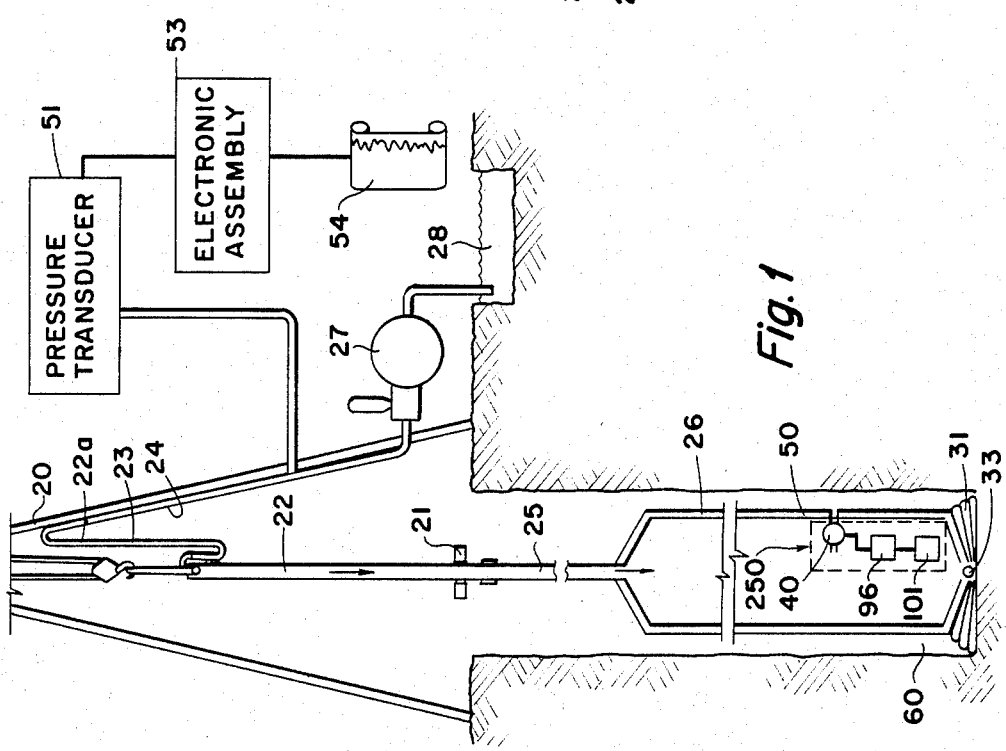

BOREHOLE MEASUREMENT WHILE DRILLING SYSTEMS AND METHODS

This application is a continuation application of application Ser. No. 68,526 filed by Serge Scherbatskoy on Aug. 21, 1979 for "Borehole Measurements While Drilling Systems and Methods", now abandoned, which in turn was a continuation in part of application, Ser. No. 857,677 filed by Serge A. Scherbatskoy on Dec. 5, 1977 and now abandoned on "Improved Systems, Apparatus and Methods for Logging While Drilling".

FIELD OF THE INVENTION

This invention generally pertains to measurements while drilling a bore hole in the earth and more particularly pertains to systems, apparatus, and methods utilizing hydraulic shock waves in the drilling mud column for transmission of signals representing one or more downhole parameters to the earth's surface.

DESCRIPTION OF THE PRIOR ART

This invention relates to data transmission systems for use in transmitting data from the bottom of a well bore to the surface while drilling the well.

It has been long recognized in the oil industry that the obtaining of data from downhole during the drilling of a well would provide valuable information which would be of interest to the drilling operator. Such information as the true weight on the bit, the inclination and bearing of the borehole, the tool face, fluid pressure, and temperature at the bottom of the hole and the radioactivity of substances surrounding or being encountered by the drill bit would all be expressed by quantities of interest to the drilling operator. A number of prior art proposals to measure these quantities while drilling and to transmit these quantities to the surface of the earth have been made. Various transmission schemes have been proposed in the prior art for so doing. For a description of prior art see for instance U.S. Pat. No. 2,787,795 issued to J. J. Arps, U.S. Pat. No. 2,887,298 issued to H. D. Hampton, U.S. Pat. No. 4,078,620 issued to J. H. Westlake et al, U.S. Pat. No. 4,001,773 issued to A. E. Lamel et al, U.S. Pat. No. 3,964,556 isued to Marvin Geahart et al, U.S. Pat. No. 3,983,948 issued to J. D. Jeter, and U.S. Pat. No. 3,791,043 issued to M. K. Russell. All of the above listed patents are incorporated in this specification by reference.

Perhaps the most promising of these prior art proposals in a practical sense has been that of signalling by pressure pulses in the drilling fluid. Various methods have been suggested in the prior art to produce such mud pulsations either by a controlled restriction of the mud flow circuit by a flow restricting valve appropriately positioned in the main mud stream or by means of a bypass valve interposed between the inside of the drill string (high pressure side) and the annulus around the drill string (low pressure side).

SUMMARY OF THE INVENTION

The present invention relates to a system and apparatus for making measurements while drilling a borehole in the earth. The system employs the production of pressure pulses in the drilling fluid column. In the standard method of drilling boreholes, drill pipe is rotated by apparatus at the earth's surface to, in turn, rotate a bit at the lower end. Drilling fluid is circulated down through the interior of the drill pipe, out through jets in the bit and the drilling fluid returns to the earth's surface in the annular space within the borehole surrounding the exterior of the drill bit. In the pulse telemetry system as employed in this invention, pressure pulses are created in the drilling fluid column within the drill string which are detected at the earth's surface.

In order to create pressure pulses in the drilling fluid column a pulser apparatus is employed. The pulser apparatus is typically of the type which has a valve opened and closed in a coded format to vent drilling fluid from the interior of the drill string into the well annulus. The vented fluid thereby bypasses the restrictions imposed by the drill bit jets and cause pressure pulses in the drilling fluid column. In order to operate a pulser, electrical power must be used and this is typically supplied by batteries. Housing must be provided for such batteries. In addition, instruments used to detect the information which is to be transmitted to the earth's surface, and circuitry employed to perform such functions as to activate/deactive transmission sequences and to operate the pulser to transmit data in response to measurements detected by the instrument or instruments must be housed.

A serious problem which has faced those interested in mud pulse telemetering is that of physically adapting the equipment to the standard drilling system. A drill string is made up of standard lengths of drill pipe. Usually each length of drill pipe is about 30 feet long. The drill string may employ the use of drill collars, that is, lengths of drill pipe having essentially larger OD as the other portions of the drill string but having a thicker wall so as to add weight to the lower end of the drill string. Such drill collars are typically placed immediately above the bit to apply weight to the bit even though the upper portion of the drill string may be held in tension when drilling the deep wells. Whether or not the mud pulse telemetry system is mounted in the portion of the drill string composed of standard lengths of drill pipe or drill collars, a serious problem in providing a means effectively utilizng the equipment was to enter drilling techniques as existed.

In the typical use of mud pulse telemetry, the telemetry system is not positioned in the drill string at all times. It is typically placed in the drill string immediately in advance of drilling through a stratum where data will be required more or less on a real time basis, that is, wherein it is important to have data as to the orientation of the drill bit, downhole pressure, downhole temperature, or other information as to the borehole such as the formation composition which can be indicated by gamma ray instruments and so forth. Since the mud pulse telemetry system is to be installed only at critical periods in the drilling of a deep well which may take many days or even months, it is important that the apparatus used to provide such information be readily delivered to or removed from a well site and that it be arranged in such a way that with minimal labor it can be installed in or removed from a drill string.

In the past, those who have endeavored to provide mud pulse telemetry have typically utilized a housing consisting of an entire standard length of drill pipe or drill collar. Since these items are typically about 30 feet long and weigh typically several tons, they obviously cannot be transported other than by a large truck. Further, it can be seen that a housing for an instrument of this size and weight is exceedingly expensive.

The present invention provides a unique system for employing mud pulse telemetry in a rotary drilling system wherein the equipment is of size and weight such that it can be transported by a pickup truck or van and handled by one or two men. To achieve this result the pulser apparatus is housed in a special sub or pulser sub which may be of relatively short length, such as about three feet. The pulser sub typically conforming to the diameter of the drill pipe with which it is used and has, at its upper and lower end, standard drill pipe threads so that it can be inserted directly into the drill string. Where the pulser sub is to be inserted in a length of heavy wall drill collars, it has an interior diameter greater than that of the standard drill collar so as to allow room for the pulser and to permit the flow of fluid through the pulser sub around the pulser when mounted in the sub.

A more difficult problem, however, is that of positioning the ancillary equipment, including batteries, instruments, electronics and so forth. This problem is solved in the present invention by providing an elongated housing which is supported by the pulser sub. The housing has an outside diameter less than the internal diameter of the drill pipe adjacent the special sub and the housing is telescopically positioned within the adjacent drill pipe. The reduced external diameter of the housing permits the flow of drilling fluid within the drill pipe past the housing.

In this manner a special pulser sub with its appended elongated housing can be easily mounted in or removed from a drill string.

BRIEF DESCRIPTION OF DRAWINGS

FIG. 1 schematically and generally illustrates a well drilling system equipped to simultaneously drill and to make measurements in accordance with some aspects of my invention.

FIG. 3 shows schematically the "sub" and housing structure for the special telemetry tool.

FIG. 4 shows schematically the cross-sections of housing portion of FIG. 3.

FIG. 5 shows schematically special connector means that may be utilized for joining the sub-sections of housing portion [250b] of FIG. 3.

DESCRIPTION OF THE PREFERRED EMBODIMENTS

Figure 2:
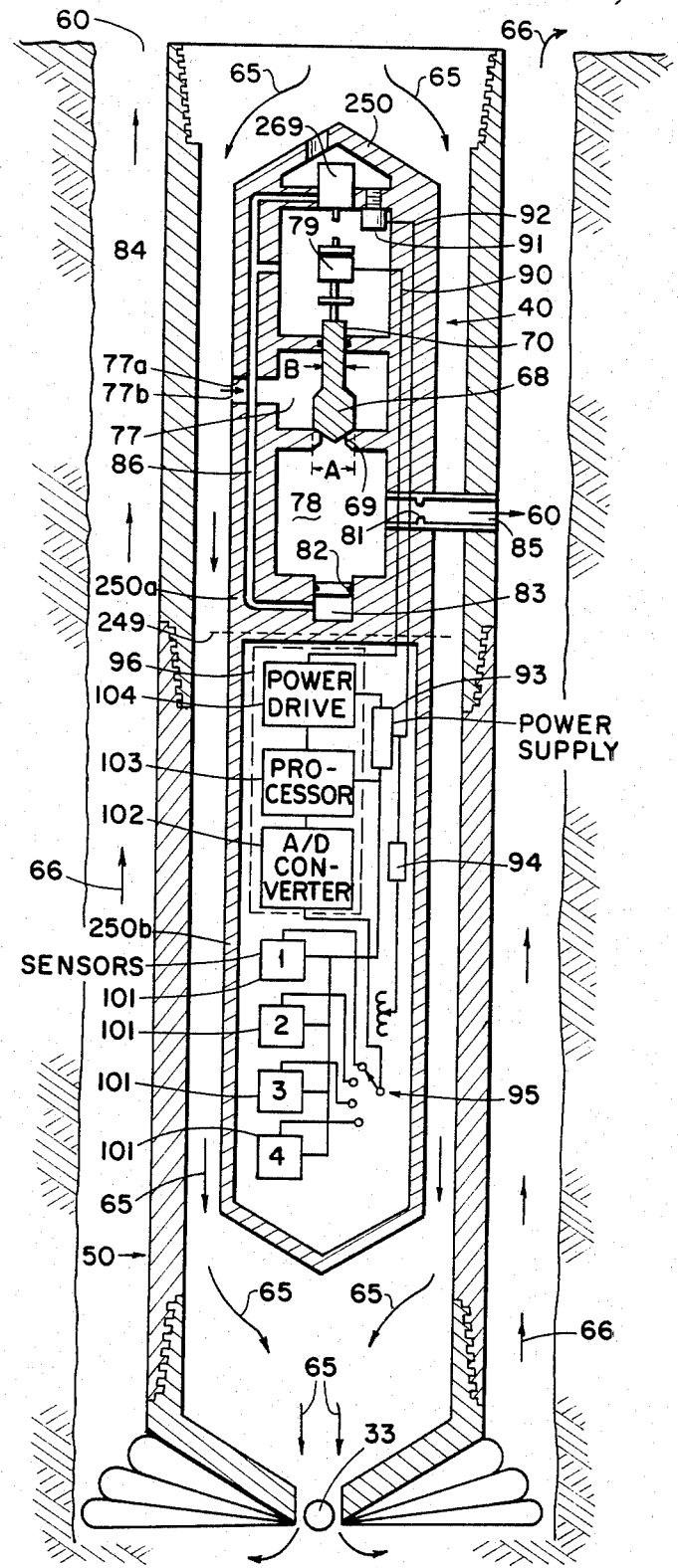
FIG. 2 shows schematically a portion of the sub-surface equipment including a special telemetry tool in accordance with my invention.

I. General Description of Apparatus for Data Transmission While Drilling

FIG. 1 illustrates a typical layout of a system embodying the principles of this invention. Numeral 20 indicates a standard oil well drilling derrick with a rotary table 21, a kelly 22, hose 23, and standpipe 24, drill pipe 25, and drill collar 26. A mud pump or pumps 27 and mud pit 28 are connected in a conventional manner and provide drilling mud under pressure to the standpipe. The high pressure mud is pumped down the drill string through the drill pipe 25 and the standard drill collars 26 and then through the special telemetry tool 50 and to the drill bit 31. The drill bit 31 is provided with the usual drilling jet devices shown diagrammatically by 33. The diameters of the collars 26 and the telemetry tool 50 have been shown large and out of proportion to those of the drill pipe 25 in order to more clearly illustrate the mechanisms. The drilling mud circulates downwardly through the drill string as shown by the arrows and then upwardly through the annulus between the drill pipe and the wall of the well bore. Upon reaching the surface, the mud is discharged back into the mud pit (by pipes not shown) where cuttings of rock and other well debris are allowed to settle and to be further filtered before the mud is again picked up and recirculated by the mud pump.

Interposed between the bit 33 and the drill collar 26 is the special telemetering transmitter assembly or telemetry tool designated by numeral 50. This special telemetering transmitter assembly 50 includes a housing 250 which contains a valve assembly, or simply a valve 40, an electronic processing assembly 96, and sensors 101. The valve 40 is designed to momentarily by-pass some of the mud from the inside of the drill collar into the annulus 60. Normally (when the valve 40 is closed) the drilling mud must all be driven through the jets 33, and consequently considerable mud pressure (of the order of 2000 to 3000 psi) is present at the command of a sensor 101 and electronic processing assembly 96, some mud is bypassed, the total resistance to flow is momentarily decreased, and a pressure change can be detected at the standpipe 24. The electronic processing assembly 96 generates a coded sequence of electric pulses representative of the parameter being measured by a selected sensor 101, and corresponding openings and closings of the valve 40 are produced with the consequent corresponding pressure pulses at the standpipe 24.

Numeral 51 designates a pressure transducer that generates electric voltage representative of the pressure changes in the standpipe 24. The signal representative of these pressure changes is processed by electronic assembly 53, which generates signals suitable for recording on recorder 54 or on any other display apparatus. The chart of recorder 54 is driven by a drive representative of the depth of the bit by means well known (not illustrated).

II. General Description of Special Telemetering Transmitter

FIG. 2 shows certain details of the special telemetering transmitter 50. Certain of these and other details have also been described in the above referred to co-pending application Ser. No. 857,677 filed by S. A. Scherbatskoy now abandoned, of which this application is a continuation in part. FIG. 2 is diagrammatic in nature. In an actual tool, the housing 250, which contains the valve 40, the electronic processing assembly 96, and the sensors 101, is divided into two sections 250a and 250b. The upper portion 250a (above the dotted line 249) contains the valve assembly 40 and associated mechanisms and, as will be pointed out later in the specification, is of substantially larger diameter than 250b. The lower section 250b (below the dotted line 249) contains the electronic processing assembly 96, sensors 101, and associated mechanisms, and as will be explained later in the specification, has a substantially smaller diameter than the upper section 250a. As shown in FIG. 2, the drilling mud circulates past the special telemetry tool 250a, 250b downwardly (as shown by the arrows 65) through the bit nozzle 33 and then back (as shown by the arrows 66) to the surface in annulus 60 and to the mud pit 28 by pipe means not shown. The valve assembly 40 comprises valve stem 68 and valve seat 69. The valve stem and seat are constructed in such manner that the cross sectional area of the closure A is slightly larger than the cross sectional area B of the compensating piston 70. Thus, when the pressure in chamber 77 is greater than that in the chamber 78, the valve stem 68 is forced downwardly; and the valve 40 tends to close itself more tightly as increased differential pressure is applied.

The fluid (mud) pressure in chamber 77 is at all times substantially equal to the fluid (mud) pressure inside the drill collar, designated as 26 in FIG. 3 and 50 in FIG. 2, because of the opening 77a in the wall of the assembly 250. A fluid filter 77B is interposed in passageway 77a in order to prevent solid particles and debris from entering chamber 77. When the valve 40 is closed, the fluid (mud) pressure in chamber 78 is equal to the fluid (mud) pressure in the annulus 60. When the valve 40 is open and the pumps are running mud flow occurs from chamber 77 to chamber 78 and through orifice 81 to the annulus 60 with corresponding pressure drops.

Double acting electromagnetic solenoid 79 is arranged to open or close valve 40 in response to electric current supplied by electric wire leads 90.

Referring again to FIG. 2, numeral 91 indicates an electric "pressure switch" which is electrically conductive when $P_{77} > P_{78}$ (pump running) and electrically non-conductive when $P_{77} = P_{78}$ (pumps shut down—not running). Wire 92 running from pressure switch 91 to power supply 93 can, therefore, turn the power on or off. Also, by means of electronic counter 94 and electromagnetic sequence switch 95, any one of the four sensors 101 can be operatively connected to the electronic processing assembly 96 by sequentially stopping and running the mud pumps 27 or by stopping then running the pumps in accordance with a predetermined code that can be interpreted by circuitry in element 94.

DESCRIPTION OF SUB AND HOUSING STRUCTURE FOR SPECIAL TELEMETRY TOOL

An important characteristic of the Measurement While Drilling (MWD) apparatus of this invention is its practicality; i.e., convenience and ease of adaptability to existing oil well drilling hardware amd tools and drill strings. In the attempts of the prior art, large special steel housings 30 feet or more in length and 8 inches in diameter are required to house the complicated instrumentation; and their transportation from location to location requires specially constructed vehicles. In the apparatus of this invention, because there is no valving mechanism interposed in the main mud stream, it is possible to eliminate the heavy, very long, expensive special housing (approximately 30 feet long) and only a short section of drill collar (called a "sub") is required. In the practical embodiment of this invention, this sub is only 36 inches long and $6\frac{3}{4}$ inches in diameter (instead of 30 feet which was previously required).

One of the important features of this invention, therefore, is that no heavy, long special housings are required. This is advantageous especially when downhole magnetic measurements such as compass indications (e.g., steering the drilling of a deviated hole) are to be made, which require use of non-magnetic drill collars. Non-magnetic drill collars are not only heavy (2-3 tons) but also extremely expensive ($20,000 each) since they must be manufactured of strictly non-magnetic material such as K Monel. In the construction of the apparatus of this invention "Standard" API Drill Collars having outside diameters of 6" to 9" (which are the most common sizes) are utilized. All of the standard API collars have an inside diameter of 2-13/16"+1/16"-0". The simplicity, small size and coaxial construction of the valve system of this invention and its associated parts allow a special feature to be accomplished: All of the pertinent power drive and associated equipment can be located in a pressure resisting tube sufficiently small in diameter to permit it to be inserted into the inside bore (2-13/16") of a standard API Drill Collar without unduly interfering with mud flow. Some Sensors should be placed as near to the drill bit as possible. In particular, a downhole gamma ray Sensor should be capable of detecting the penetration of the bit into a given lithologic formation as soon as such penetration occurs. Furthermore, some sensors, such as a downhole compass-inclinometer require accurate indexing with respect to the "tool face" used in directional drilling. In addition, a compass-inclinometer must be placed at a substantial distance from any magnetic or paramagnetic material. Furthermore, when a compass-inclinometer is employed, the housings 250a and 250b in FIG. 3 must be carefully indexed angularly with respect to the sub 253, which in turn is indexed with respect to the "Bent Sub" used in directional drilling.

The "bent sub" is equipped with an indexing mark 253a and the angle of this indexing mark must have a constant and measured angular relationship to the indexing mark 254a that is placed on the telemetering sub 254. This known angle (representing the angle between indexing marks 253a and 254a is then introduced into the computation for the determination of the bearing and angle with respect to a vertical plane of the "Bent Sub".

FIG. 3 is a schematic showing of the special telemetry tool 50, illustrating the arrangement wherein the "special long tool" is eliminated and only a short section of drill collar sub is required, as was previously mentioned. In FIG. 3 a housing designated by numeral 250 is made up of an upper section 250a and a lower section 250b, as was previously described with reference to FIG. 2. The upper section 250a is contained within a short sub 254 (only about 36 inches long). This short sub is especially bore out to provide an inside diameter (e.g. $4\frac{1}{2}$") sufficient to house the valve assembly 40 and also to permit the unrestricted flow of drilling mud past upper section 250a through passages 61, which are also designated by numeral 61 in FIG. 2. The housing 250a is of a small diameter, preferably, 2 11/16" OD or less. A drill collar 255 provided by the user (the oil company or the drilling contractor) is usually 30 feet long and of great weight and cost. The inside diameter of a standard API Drill Collar as was pointed out previously is 2-13/16"-0+1/16". Centralizer members 256 are provided for lower housing 250b. These are slightly smaller in diameter than the ID of the standard API Drill Collar, for example, $2\frac{3}{4}$" O.D. Small clearance is very important in order to prevent "chatter" when the tool is vibrated during drilling. Discharge passage 85 is the same as that shown in FIG. 2. The housing 250b is suspended within the sub 254 by securing means not shown. The cross-section shape of the centralizers 256, as indicated in FIG. 4, is such as to provide slots or passages 258 to permit free flow of drilling mud.

The housing lower section 250b is actually made up of several sub-sections which are connected, one to another, by a special connector means shown in FIG. 5. As shown in FIG. 5, each sub-section is provided at its upper end slot 260 and at its lower end a protrusion or tooth 261. A protrusion 261 of one sub-section matingly engages a slot 260 of the adjacent sub-section. The adjacent sub-sections are retained by a connector sleeve 262 which is matingly received by the end portions of the sub-sections. Circular openings 263 in the sub-sections are aligned with respective threaded openings 264 in the connector sleeve 262, and the parts are secured by screws 265. The special connector means of FIG. 5 provides for accurate angular indexing when sub 253 is a "Bent Sub".

As was pointed out previously, the angle between indexing marks 253a and 254a must be known in order to compute the angle with respect to vertical of the "Bent Sub". It is also necessary that the angular displacement between the axes of a magnetometer-inclinometer and the mark 254a be known and invariable during the drilling operation (it is preferred but not necessary that the angle between one of the horizontal axes of the magnetometerinclinometer and the indexing mark 254a be zero). For this purpose the tool 250b is assembled with angular indexing teeth 261 as shown on FIG. 5 and FIG. 3.

I claim:

1. Apparatus for use in making measurements in conjunction with a drilling system for drilling a borehole in the earth, the drilling system including a drill string suspended in a borehole, the drill string including a plurality of lengths of drill pipe some of which may be lengths of drill collars, a drilling means affixed to the lower end of the drill string, a mud pump connected to the upper end of the drill string for circulating drilling fluid therethrough, the apparatus comprising sensor means and instrumentation means for generating electric signals representative of the magnitude of one or more downhole parameters, pulser means for producing pressure pulses in the drilling fluid in response to the electric signals received from said instrumentation means, a pulser sub threadably secured at its upper and lower ends to length of drill pipe in the drill string, said pulser means being mounted within said pulser sub, an elongated housing supported by said pulser sub, said housing having an outside diameter less than the internal diameter of the adjacent drill pipe and being slideably received in the drill pipe adjacent in the drill string to said pulser sub, said pulser and said housing permitting the flow of drilling fluid therepast, said housing containing at least a portion of said instrumentation means.

2. The apparatus according to claim 1 wherein said pulser sub is of length short as compared to a standard length drill pipe.

3. The apparatus of claim 1 wherein said instrumentation means includes a power supply means contained within said elongated housing.

4. The apparatus according to claim 1 including means of establishing and maintaining orientational alignment between said pulser sub and said housing.

5. The apparatus of claim 1 wherein said sensor means is contained in said elongated housing.

6. The apparatus of claim 1 wherein said elongated housing comprises a plurality of axially aligned sub-sections.

7. The apparatus of claim 1 including stabilizing means affixed to the exterior of said elongated housing to resist lateral motion of the elongated housing relative to the drill pipe in which it is positioned, the stabilizing means being configured to permit the flow of drilling fluid therepast.

* * * * *